United States Patent Office 2,802,013
Patented Aug. 6, 1957

2,802,013

2-(OXO AND IMINO)-3-(PHENYL AND HALOPHENYL) - TETRAHYDROFURANSULFONES AND PROCESSES FOR THE MANUFACTURE THEREOF

Raymond M. Dodson, Park Ridge, Ill., assignor, by mesne assignments, to G. D. Searle & Co., Skokie, Ill., a corporation of Delaware No Drawing. Application February 12, 1954,
Serial No. 410,039

14 Claims. (Cl. 260—343.6)

This invention relates to phenyl and halophenyl derivatives of oxo and imino tetrahydrofuransulfones, and to processes for the preparation thereof. More particularly, this invention relates to compounds of the formula

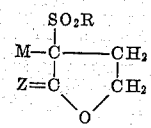

wherein R is a monovalent hydrocarbon radical containing not more than 7 carbon atoms, M is a phenyl or halophenyl radical, and Z is NH or O. Among the hydrocarbon radicals comprehended by R as defined above are methyl, ethyl, cyclopentyl, cyclohexyl, phenyl, benzyl, and tolyl radicals.

The compounds of this invention are useful in medicine as cardioregulatory agents. Especially, they are of importance as antihypertensives, being capable of reducing the elevated blood pressures characteristic of multiple disease states.

The subject compounds are soluble in lower alcohols and ketones—for example, methyl alcohol, ethyl alcohol, acetone, and the like—and in aqueous solutions of these materials, as well as in other common organic solvents. The compounds which comprise this invention may be administered in solid form as tablets or capsules; dissolved in aqueous media, they may be given parenterially.

The imino compounds to which this invention relates are prepared by reacting an appropriate phenyl or halophenyl cyanosulfone of the formula

wherein M and R have the meanings hereinabove assigned, with ethylene oxide in the presence of a base, using water as a solvent. The reaction proceeds nicely at room temperature in a few minutes. The 2-imino-3-(phenyl or halophenyl)-3-sulfonyltetrahydrofurans of this invention thus obtained may be converted to the claimed oxo compounds by heating for short periods of time in aqueous solvent containing a small amount of mineral acid. Temperatures of 55° to 110° centigrade for between 20 minutes and 1½ hours are satisfactory for effecting this reaction.

The cyanosulfones which serve as intermediates in the preparation of compounds of this invention are synthesized as follows: Benzaldehyde or a halobenzaldehyde is reacted with an alkali metal cyanide and a sulfonyl chloride of the formula

R′ being defined as a monovalent hydrocarbon radical containing not more than 7 carbon atoms, the reaction preferably being carried out at reduced temperatures of the order of 0–5° centigrade using an aqueous medium.

The hydrocarbon sulfonate which results, the formula of which is

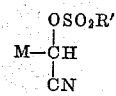

wherein M and R′ are defined as before, is then converted to the cyanosulfone by interaction in a polar solvent—for example, a ketonic solvent such as acetone—with thiourea and a sulfonyl chloride of the formula

wherein R has the meaning assigned above.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

EXAMPLE 1

A. *α-Phenyl-α-phenylsulfonylacetonitrile.*—A mixture of 106 parts of benzaldehyde, 176 parts of benzenesulfonyl chloride, 49 parts of sodium cyanide, and 200 parts of water is maintained with stirring at 0–5° C. for 2½ hours. The precipitate which forms is recovered on a filter, washed thereon with water, and then dissolved in 560 parts of acetone. To this solution, with agitation, is added 176 parts of benzenesulfonyl chloride, followed portion-wise by 152 parts of thiourea. The slurry which forms is cooled at 0–5° C. for one hour and then treated with 400 parts of ethyl alcohol and 500 parts of water. The mixture is heated to 90° C., cooled, and filtered, in that order. The precipitate thus recovered is washed by suspension in water and then isolated by filtration, whereupon it is taken up in dilute aqueous potash. A small amount of insoluble material is filtered out, and the filtrate is then made acid with glacial acetic acid. The product which precipitates, crystallized from dilute aqueous acetone, is α-phenyl-α-phenylsulfonylacetonitrile, M. P. 148–150° C.

B. *2-imino-3-phenyl-3-phenylsulfonyltetrahydrofuran.*— A solution of 257 parts of the cyanosulfone of the preceding part A in 2500 parts of water containing 112 parts of potash is filtered and then reacted with 88 parts of ethylene oxide. The reagents are allowed to stand for 2 hours. After about 5 minutes an oil separates, a sample of which, triturated with anhydrous ether, crystallizes. The crystals thus obtained are used to seed the balance of the product. The material is filtered off and subsequently washed on the filter with a little water, following which it is taken up in methyl alcohol. The solution is treated with decolorizing charcoal, heated to boiling, and diluted with sufficient water to produce cloudiness, in that order. Upon cooling, a precipitate of 2-imino-3-phenyl-3-phenylsulfonyltetrahydrofuran comes down in good yield. The material shows M. P. 125–127° C. and has the formula

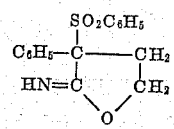

EXAMPLE 2

*2-oxo-3-phenyl-3-phenylsulfonyltetrahydrofuran.*—To a solution of 60 parts of muriatic acid in 250 parts of water is added 5 parts of the imino derivative of the preceding Example 1. Approximately 235 parts of methyl alcohol is next introduced, following which the reactants are heated at 85–100° C. for 1 hour. The hot reaction mixture is then diluted with water until crystallization commences. Precipitation proceeds as the mixture cools. The crystalline product, 2-oxo-3-phenyl-3-phenylsulfonyltetrahydrofuran, shows M. P. approximately 125–125.5° C. Recrystallization from dilute aqueous methyl alcohol does not improve this melting point. The product has the formula

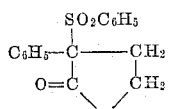

EXAMPLE 3

A. α-*Cyano-p-chlorobenzyl benzenesulfonate.*—A mixture of 70 parts of p-chlorobenzaldehyde, 88 parts of benzenesulfonyl chloride, 25 parts of sodium cyanide, and 100 parts of water is allowed to stand for 3 hours at 0–5° C. with occasional agitation. Cooling is then discontinued and the reaction mixture let stand for 1 hour at room temperature with continued occasional agitation. The aqueous layer is separated and discarded. The oily residue is purified by dissolution in a mixture of acetone, alcohol, and ether; filtration of this solution; and precipitation of the filtrate with 150 parts of ice. The oil which separates contains α-cyano-p-chlorobenzyl benzenesulfonate.

B. α-*(p-Chlorophenyl)-α-methylsulfonylacetonitrile.*— To a solution of 62 parts of α-cyano-p-chlorobenzyl benzenesulfonate and 23 parts of methanesulfonyl chloride in 80 parts of acetone is added, portion-wise with agitation over a 25-minute period, 30 parts of thiourea. After 15 minutes a clear solution results. The reactants are allowed to stand for 3 hours, then diluted with 80 parts of ethyl alcohol and sufficient water to produce a clear solution. The solution is heated at 85–100° C. for half an hour, following which it is cooled, diluted with water, and extracted with ether, in that order. The ether extract is, in turn, extracted first with water and then with dilute aqueous potash. The alkaline extract, upon acidification, precipitates a crystalline solid which, crystallized from a mixture of benzene and petroleum ether and then from methyl alcohol, shows M. P. approximately 116.5–117° C. This material is α-(p-chlorophenyl)-α-methylsulfonylacetonitrile.

C. *3-(p-Chlorophenyl)-2-imino-3-methylsulfonyltetrahydrofuran.*—To a filtered solution of 140 parts of the cyanosulfone of the preceding part B in 2500 parts of water containing 56 parts of potash is added 44 parts of ethylene oxide. In a short time an oil separates, a sample of which is induced to crystallize by conventional manipulation (for example, by standing in contact with anhydrous ether and/or scratching). The crystals thus obtained are used to seed the balance of the oily precipitate. The solid product which results is removed from the reaction mixture after 3 hours and washed thoroughly with water. It shows M. P. 105–106° C. Recrystallization from dilute aqueous methyl alcohol does not improve this melting point. The product, 3-(p-chlorophenyl)-2-imino-3-methylsulfonyltetrahydrofuran, has the formula

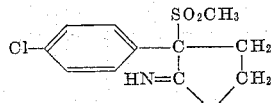

EXAMPLE 4

A. α-*Cyano-3,4-dichlorobenzyl benzenesulfonate.*—A mixture of 88 parts of 3,4-dichlorobenzaldehyde and 88 parts of benzenesulfonyl chloride is heated at 85–100° C. until solution is complete. The solution is cooled to room temperature, forming a thick paste. To this paste is added a solution of 25 parts of sodium cyanide in 75 parts of water. The reagents are maintained with agitation at 0–5° C. for 3 hours, whereupon the aqueous supernatant is decanted from the oily residue and the residue then washed well with water. The material thus obtained is α-cyano-3,4-dichlorobenzyl benzenesulfonate.

B. α-*(3,4 - dichlorophenyl) - α - methylsulfonylacetonitrile.*—To a solution of approximately 69 parts of the sulfonate of the preceding part A and 23 parts of methanesulfonyl chloride in 275 parts of acetone is added, portionwise with agitation, 45 parts of thiourea. The reagents are allowed to stand with continued agitation. A precipitate forms after about 1 hour. Agitation is continued for 2 hours longer, at which point approximately 160 parts of ethyl alcohol is added, followed by sufficient water to dissolve insoluble matter. Precipitation reoccurs in a short time. The mixture is allowed to stand 12 hours at room temperature, diluted with water and finally extracted several times with ether. The ether extracts are combined and extracted in turn with dilute aqueous potash. Upon acidification of the alkaline extract, an oil comes down which granulates on standing. Fractional crystallization from aqueous acetone affords a good yield of α-(3,4-dichlorophenyl)-α-methylsulfonylacetonitrile, M. P. 156–158° C. The mother liquors, combined and chromatographed on silica gel using benzene and ethyl acetate as developing solvents, return an additional amount of the desired product.

C. *3-(3',4' - dichlorophenyl)-2-imino-3-methylsulfonyltetrahydrofuran.*—A solution of 538 parts of the cyanosulfone of the preceding part B in 5000 parts of water containing 224 parts of potash is reacted with 192 parts of ethylene oxide over a period of 1 hour. Precipitation occurs in process. The precipitate is filtered out, washed well with water, and crystallized from dilute aqueous methyl alcohol, in that order. It shows M. P. 133–135° C. Recrystallization from a mixture of acetone and cyclohexane does not alter this melting point. The product has the formula

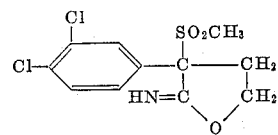

EXAMPLE 5

*3-(3',4'-dichlorophenyl)-3-methylsulfonyl - 2 - oxotetrahydrofuran.*—Approximately 186 parts of the imino compound of Example 4 is dissolved in 2000 parts of methyl alcohol. To this solution is added 600 parts of muriatic acid and 1000 parts of water. Precipitation occurs. An additional 6400 parts of methyl alcohol is introduced to dissolve this precipitate. The reagents are heated for half an hour at 85–110° C. and then chilled. The product which precipitates in process shows M. P. 161–162.5° C. Recrystallization from dilute aqueous acetone does not alter this melting point. The product thus obtained is 3-(3',4' - dichlorophenyl)-3-methylsulfonyl-2-oxotetrahydrofuran having the formula

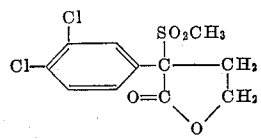

EXAMPLE 6

A. α-*Cyanobenzyl benzenesulfonate.*—A mixture of 53 parts of benzaldehyde, 88 parts of benzenesulfonyl chloride, 25 parts of sodium cyanide, and 100 parts of water is allowed to stand for 3 hours at 0–5° C. with occasional agitation. The cream-colored solid precipitated in process is filtered out and then dissolved in a cold mixture of 80 parts of acetone, 80 parts of ethyl alcohol, and 35 parts of ether. A small amount of material remains undissolved and is discarded. Addition of 150 parts of ice precipitates α-cyanobenzyl benzenesulfonate as an oil which granulates on standing. Crystallized from ethyl alcohol, it shows M. P. 57.5–58.5° C.

B. *α-Cyclohexylsulfonyl - α - phenylacetonitrile*.—To a mixture of 39 parts of the sulfonate of the preceding part A and 26 parts of cyclohexanesulfonyl chloride—prepared by interaction of cyclohexane nad sulfuryl chloride at reflux temperatures in the presence of pyridine—in 55 parts of acetone is added, portion-wise with agitation over a 30-minute period, 27 parts of thiourea. The reagents are allowed to stand for an additional 30 minutes with continued agitation, following which 55 parts of ethyl alcohol, and then sufficient water to dissolve precipitated material and bring the solution again to the point of cloudiness, are added. The reagents are allowed to stand overnight. Water is added and the resultant mixture is extracted with ether. The ether extract is washed with water, filtered free of a small amount of insoluble material, and extracted with dilute aqueous potash, in that order. A dark brown oil which separates is discarded, as is the ether phase. The alkaline extract is acidified with dilute muriatic acid, precipitating the desired α-cyclohexylsulfonyl-α-phenylacetonitrile which is separated and used in the succeeding part C of this example.

C. *3-cyclohexylsulfonyl - 2 - imino-3-phenyltetrahydrofuran*.—Using the technique of Example 1B, 21 parts of the cyanosulfone of the foregoing part B, 9 parts of potash, and 16 parts of ethylene oxide are reacted together in 200 parts of water to give, in good yield, 3-cyclohexylsulfonyl-2-imino-3-phenyltetrahydrofuran having the formula

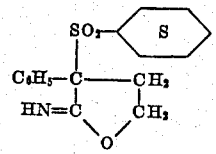

EXAMPLE 7

A. *α-Benzylsulfonyl-α-phenylacetonitrile*.—To a solution of 27 parts of α-cyanobenzyl benzenesulfonate—prepared as detailed in Example 6A above—and 27 parts of α-toluenesulfonyl chloride in 50 parts of acetone is added, portion-wise over a 30-minute period with agitation, 15 parts of thiourea. Agitation is continued for a further 2-hour period, following which the cream-colored solid which precipitates in process is removed by filtration. The precipitate is extracted with 100 parts of acetone, and this acetone extract is combined with the acetone filtrate above. The combined acetone solutions are then concentrated to one-half their original volume. Sufficient water is next added to the boiling concentrate to cause slight turbidity. Upon cooling, a light-yellow-colored solid is precipitated which, washed by trituration with alcohol and then recrystallized from benzene, shows M. P. approximately 166–166.5° C. The product is α-benzylsulfonyl-α-phenylacetonitrile.

B. *3-benzylsulfonyl - 2 - imino - 3 - phenyltetrahydrofuran*.—Using the technique of Example 1B, 135 parts of the cyanosulfone of the foregoing part A, 56 parts of potash, and 100 parts of ethylene oxide are reacted together in 1250 parts of water to produce 3-benzylsulfonyl-2-imino-3-phenyltetrahydrofuran having the formula

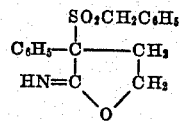

EXAMPLE 8

*3-benzylsulfonyl - 2-oxo-3-phenyltetrahydrofuran*.—The imino compound of the preceding Example 7 is converted to the corresponding oxo derivative by treatment with muriatic acid in aqueous medium according to the technique of Example 2. The 3-benzylsulfonyl-2-oxo-3-phenyltetrahydrofuran thus prepared has the formula

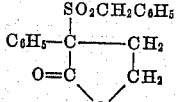

I claim:

1. A compound of the formula

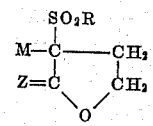

wherein R is selected from the group consisting of saturated and aromatic monovalent hydrocarbon radicals containing less than 8 carbon atoms, M is selected from the group consisting of phenyl and chlorophenyl radicals, and Z is selected from the group consisting of NH and O.

2. A compound of the formula

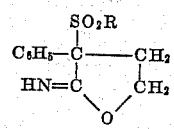

wherein R is an aromatic monovalent hydrocarbon radical containing less than 8 carbon atoms.

3. 3-benzylsulfonyl-2-imino-3-phenyltetrahydrofuran.

4. A compound of the formula

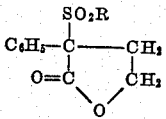

wherein R is an aromatic monovalent hydrocarbon radical containing less than 8 carbon atoms.

5. 2-oxo-3-phenyl-3-phenylsulfonyltetrahydrofuran.

6. A compound of the formula

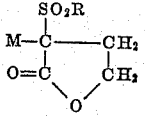

wherein R is a saturated monovalent hydrocarbon radical containing less than 8 carbon atoms and M is a chlorophenyl radical.

7. A compound of the formula

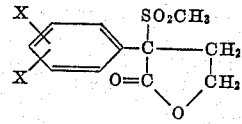

wherein X is chlorine.

8. 3-(3',4'-dichlorophenyl) - 3 - methylsulfonyl-2-oxotetrahydrofuran.

9. In a process for preparing compounds of the formula

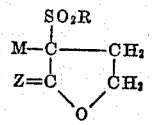

wherein R is selected from the group consisting of saturated and aromatic hydrocarbon radicals containing less than 8 carbon atoms, M is selected from the group consisting of phenyl and chlorophenyl radicals, and Z is selected from the group consisting of NH and O, the step which comprises (a) reacting a cyanosulfone of the formula

wherein R and M have the meanings hereinabove assigned, with ethylene oxide in the presence of a base, using aqueous solvent.

10. In a process for preparing compounds of the formula

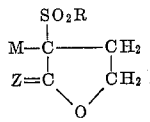

wherein R is selected from the group consisting of saturated and aromatic hydrocarbon radicals containing less than 8 carbon atoms, M is selected from the group consisting of phenyl and chlorophenyl radicals, and Z is selected from the group consisting of NH and O, the step which comprises reacting cyanosulfone of the formula

wherein R and M have the meanings hereinabove assigned, with ethylene oxide in the presence of potassium hydroxide, using water as a solvent.

11. 2-imino - 3 - phenyl - 3 - phenylsulfonyltetrahydrofuran.

12. A compound of the formula

wherein R is a saturated monovalent hydrocarbon radical containing less than 8 carbon atoms and M is a chlorophenyl radical.

13. A compound of the formula

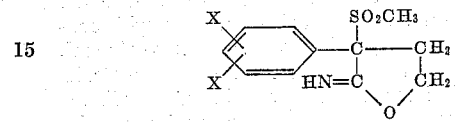

wherein X is chlorine.

14. 3-(3',4'-dichlorophenyl) - 2 - imino - 3 - methylsulfonyltetrahydrofuran.

References Cited in the file of this patent
UNITED STATES PATENTS

| | | |
|---|---|---|
| 2,402,510 | Thurston | June 18, 1946 |

FOREIGN PATENTS

| | | |
|---|---|---|
| 1,002,199 | France | Mar. 3, 1952 |
| 1,002,221 | France | Mar. 4, 1952 |
| 800,410 | Germany | Nov. 6, 1950 |